United States Patent
Kang et al.

(10) Patent No.: US 10,189,415 B2
(45) Date of Patent: Jan. 29, 2019

(54) STORAGE ASSEMBLY

(71) Applicant: Ford Global Technologies, Dearborn, MI (US)

(72) Inventors: Derek Kang, Nanjing (CN); Brick Deng, Nanjing (CN); Wei Xu, Nanjing (CN)

(73) Assignee: Ford Global Technologies, LLC, Dearborn, MI (US)

(*) Notice: Subject to any disclaimer, the term of this patent is extended or adjusted under 35 U.S.C. 154(b) by 103 days.

(21) Appl. No.: 15/486,958

(22) Filed: Apr. 13, 2017

(65) Prior Publication Data

US 2017/0313257 A1   Nov. 2, 2017

(30) Foreign Application Priority Data

Apr. 28, 2016  (CN) .......................... 2016 1 0272982

(51) Int. Cl.
*B60R 7/08* (2006.01)
*B60R 7/04* (2006.01)

(52) U.S. Cl.
CPC ................ *B60R 7/082* (2013.01); *B60R 7/04* (2013.01); *B60R 7/043* (2013.01); *B60R 7/046* (2013.01)

(58) Field of Classification Search
CPC .. B60R 7/04; B60R 7/046; B60R 7/06; B60R 7/082
USPC ............................................... 296/37.7, 37.8
See application file for complete search history.

(56) References Cited

U.S. PATENT DOCUMENTS

| | | | |
|---|---|---|---|
| 5,775,761 A | 7/1998 | Asami et al. | |
| 6,062,623 A * | 5/2000 | Lemmen | B60R 7/04 224/282 |
| 6,135,528 A * | 10/2000 | Sobieski | B60R 7/04 224/311 |
| 7,055,883 B2 * | 6/2006 | Tokutomi | B60R 1/008 296/37.7 |
| 7,121,605 B2 | 10/2006 | DePue et al. | |
| 7,661,741 B2 * | 2/2010 | Takai | B60R 7/04 296/37.1 |
| 8,157,314 B2 | 4/2012 | Gwon | |
| 8,256,062 B2 * | 9/2012 | Banks | E05D 15/0613 16/87 R |
| 9,073,494 B1 | 7/2015 | Clark et al. | |
| 2016/0068109 A1 * | 3/2016 | Nakasone | E05D 11/081 296/37.12 |

FOREIGN PATENT DOCUMENTS

WO   2013192568 A1   12/2013
WO   2015053763 A1   4/2015

* cited by examiner

*Primary Examiner* — Jason S Daniels
(74) *Attorney, Agent, or Firm* — Vichit Chea; Mohr IP Law Solutions, PC

(57) ABSTRACT

A storage assembly comprises a first portion including a shaft and a second portion including a shaft hole. The first portion is rotatably connected to the second portion via the shaft received in the shaft hole and moveable from the first rest position to the second rest position through an intermediate position. The shaft of the first portion has a stop portion protruded radially and the shaft hole is configured to contact the stop portion in the first rest position and the second rest position and to space apart radially from the stop portion in the intermediate position.

20 Claims, 8 Drawing Sheets

FIG. 7
FIG. 8
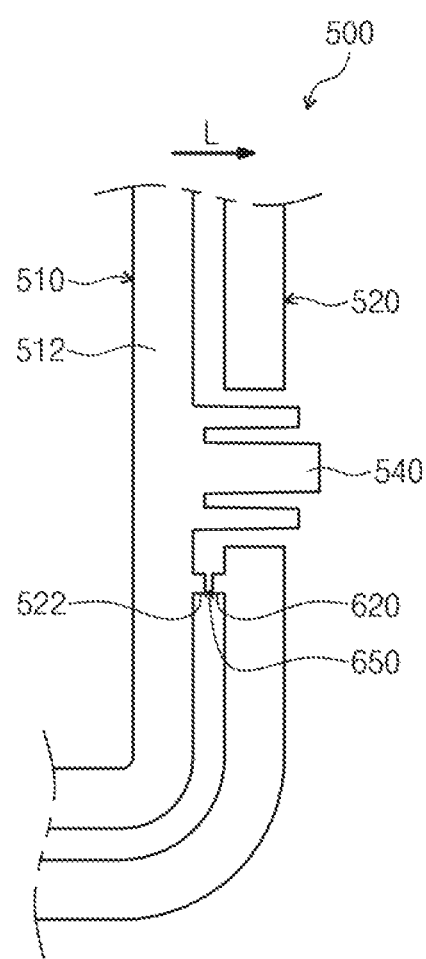
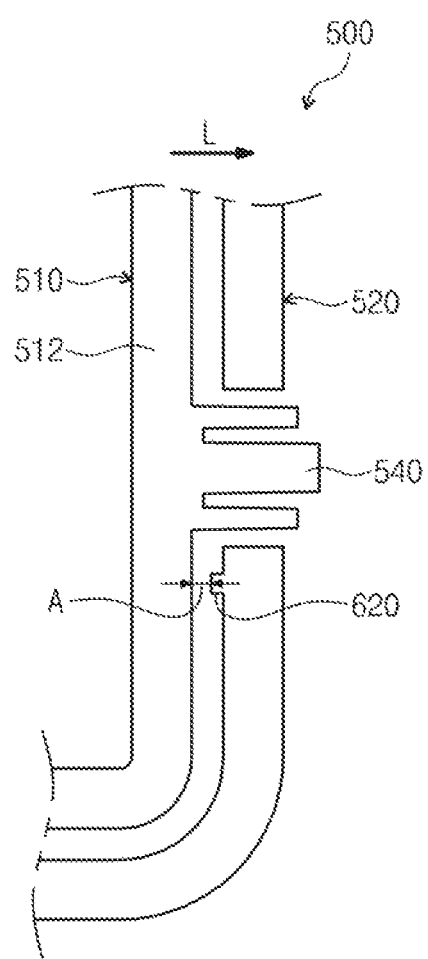

STORAGE ASSEMBLY

RELATED APPLICATION

This application claims the benefit of Chinese Patent Application No.: CN 201610272982.9 filed on Apr. 28, 2016, the entire contents thereof being incorporated herein by reference.

FIELD

The present application relates to a storage assembly, and more particularly, relates to a storage assembly in a vehicle.

BACKGROUND

Often, several storage assemblies are provided within a vehicle to store items, such as a sunglass bin positioned on the headliner or an overhead console (OHC). Such storage assemblies need to be rotatable between a closed position and an open position relative to other vehicle parts. Thus, it is desired to provide a storage assembly which could rotate freely and is easy to operate.

SUMMARY

According to one aspect of the present disclosure, a storage assembly is disclosed. The storage assembly comprises a first portion including a shaft, the shaft having a stop portion protruded radially; and a second portion including a shaft hole to receive the shaft and to allow the rotation of the shaft therein. The first portion is rotatably connected to the second portion via the shaft to rotate from the first rest position to the second rest position through an intermediate position. The shaft hole is configured to contact the stop portion in the first rest position and the second rest position and to be space apart radially from the stop portion in the intermediate position.

In one embodiment, the shaft hole may have a first section and a second section, and an intermediate portion connecting the first section and the second section. The first section and the second section contact the stop portion and the intermediate portion is spaced apart from the shaft radially in the first rest position and the second rest position.

In one embodiment, the shaft may include at least three stop portions.

In one embodiment, the stop portions may be positioned uniformly along a circumference.

In one embodiment, the shaft may include four stop portions.

In one embodiment, the shaft may have a substantially rounded rectangular cross-section.

In one embodiment, the first portion may include a first side wall having a first projection, and the second portion may include a second side wall having a second projection. The shaft may be positioned on the first side wall. The shaft hole may be positioned on the second side wall. The first projection may contact the second projection in a radial direction of the shaft in the first rest direction.

In one embodiment, the first side wall of the first portion may further include a third projection positioned to contact the second projection of the second portion in the second rest position.

In one embodiment, the second side wall of the second portion may further include a fourth projection positioned to contact the first projection of the first portion in the second rest position.

In one embodiment, the second portion may be formed as a frame member secured to the headliner, and the first portion may be formed as a sunglass bin received within the frame.

In one embodiment, the shaft hole may be configured to be in an interference fit with the shaft in the first rest position and the second rest position.

According to another aspect of the present disclosure, a storage assembly is disclosed. The storage assembly comprises: a storage bin including a first side wall and a shaft positioned on the first side wall with a cross-section of polygon shape having rounded corners, a frame member receiving the storage bin, the frame member further including a second side wall and a shaft hole positioned on the second side wall; wherein the shaft is positioned within the shaft hole, the storage bin is rotatably connected to the frame member via the shaft and is rotatable from a first rest position to a second rest position relative to the frame member, the rounded corners of the shaft contact the corresponding inner wall of the shaft hole in the first rest position and the second rest position, and a maximum distances between each side of the shaft and the corresponding inner wall of the shaft hole in the first and second working positions are greater than a maximum distance between the side of shaft and the corresponding inner wall at a non-rest position.

In one embodiment, the first rest position may define the open position of the storage bin, and the second rest position may define the closed position of the storage bin.

In one embodiment, the storage bin may rotate to an intermediate position between the open position and the closed position of the storage bin relative to the frame member.

In one embodiment, the storage bin may include a cover defining a peripheral gap between the cover and the inner wall of the frame member, and the contact between the rounded corners of the shaft and the corresponding inner wall of the shaft hole restricts the movement of the cover in a first direction substantially parallel to the first side wall to limit the size of the first gap in the first direction between the cover and the peripheral gap of the frame member.

In one embodiment, the shaft may have a rounded rectangular cross-section, and the shaft hole is configured to receive the shaft to rotate 360 degrees.

In one embodiment, the shaft may have a rounded rectangular cross-section, and the shaft hole may be configured to receive the shaft to rotate 360 degrees.

In one embodiment, the first side wall may include a first projection and a third projection. The second side wall may include a second projection and a fourth projection. The first projection may contact the second projection in a radial direction of the shaft in the first rest position and may contact the fourth projection in the radial direction in the second rest position. The second projection may contact the third projection in the radial direction in the second rest position. The radial contact between the first and second projections, the radial contact between the second and third projections, and the radial contact between the first and fourth projections may together restrict the movement of the storage bin in a second direction substantially perpendicular to the first side wall to limit the second gap in the second direction between the cover and the peripheral inner wall of the frame member.

According to another aspect of the present disclosure, a storage assembly positioned on the headliner of a vehicle is disclosed. The storage assembly comprises a storage bin including a cover and two opposing side walls, each side wall having a shaft with a cross-section that is a polygon having rounded corners; and a frame member secured to the headliner, including an opening, side wall portions corresponding to the side walls of the storage bin, and shaft holes positioned on the side wall portions; wherein the storage bin is positioned at the opening and rotatably connected to the frame member via the shaft. The storage bin is further rotatable from an open position to a closed position relative to the frame member. The rounded corners of the shaft contact the corresponding inner wall of the shaft hole to restrict the movement of the storage bin in a radial direction in the open position and the closed position.

In one embodiment, the side wall of the storage bin may include a first projection and a third projection. The side wall portion of the frame member may include a second projection and a fourth projection. In the open position, the first projection may contact the second projection in the radial direction. In the closed position, the third projection may contact the second projection and the fourth projection may contact the first projection in the radial direction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein:

FIG. 7 schematically depicts a cross-sectional view of the storage assembly referenced in FIGS. 5 and 6, wherein the storage assembly is positioned in the first rest position.

FIG. 8 schematically depicts another cross-sectional view of the storage assembly referenced in FIGS. 5 and 6, wherein the storage assembly is positioned in the intermediate position.

DETAILED DESCRIPTION

Figure 1:
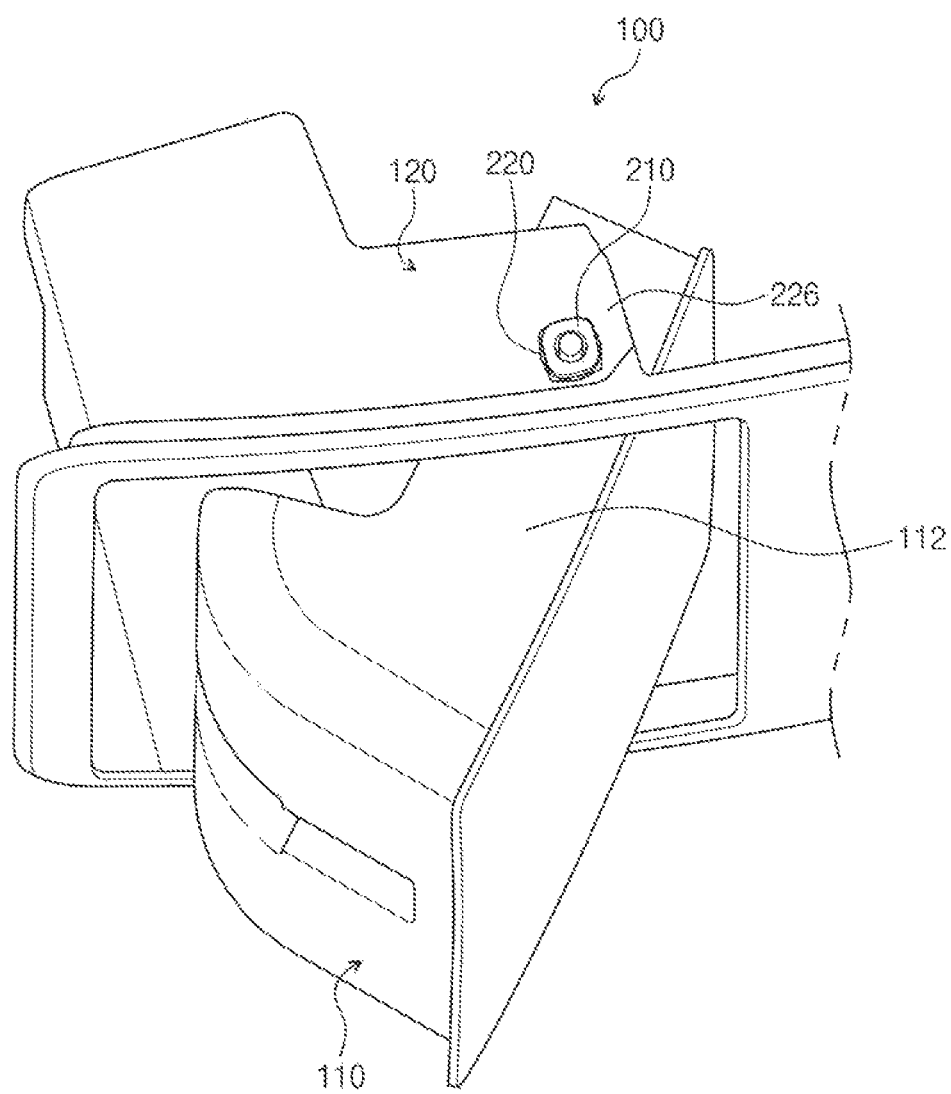
FIG. 1 shows a perspective view of a vehicle storage assembly according to one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to variously employ the present invention.

The storage assembly of the present disclosure is at least advantageous in that the two pivotable portions may be restricted in two or more directions in rest positions (such as the first and second rest positions) to achieve a close fit while defining an appropriate gap in non-rest positions (such as the intermediate position) to rotate freely.

Figure 2:
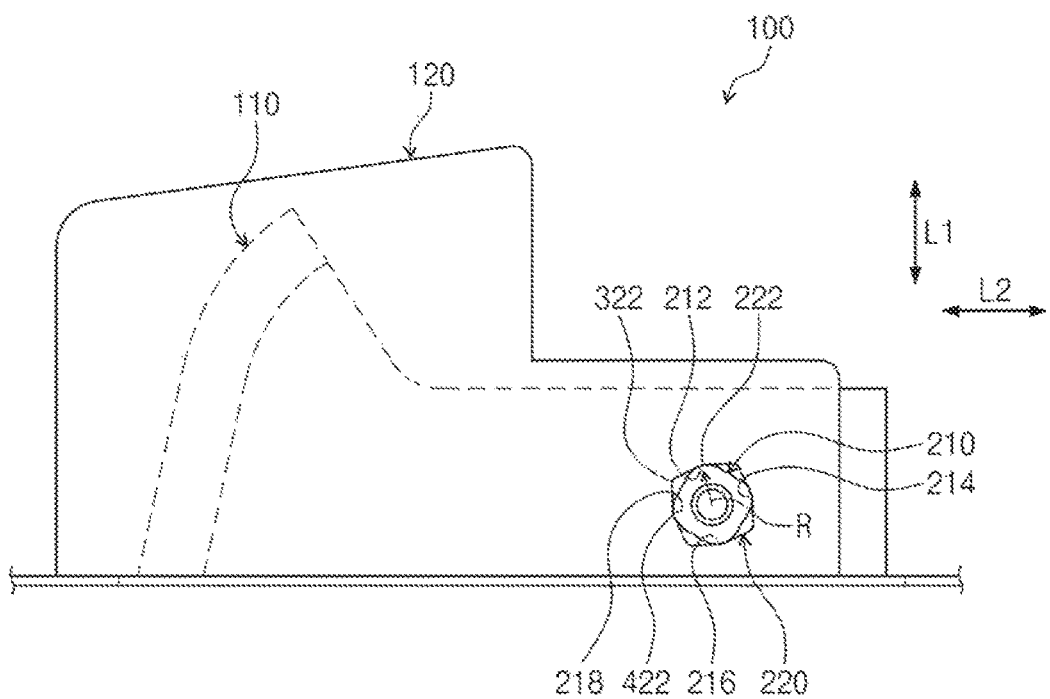
FIG. 2 schematically depicts a cross-sectional view of part of the vehicle storage assembly referenced in FIG. 1, wherein the storage assembly is positioned in a closed position or a first rest position.
Figure 3:
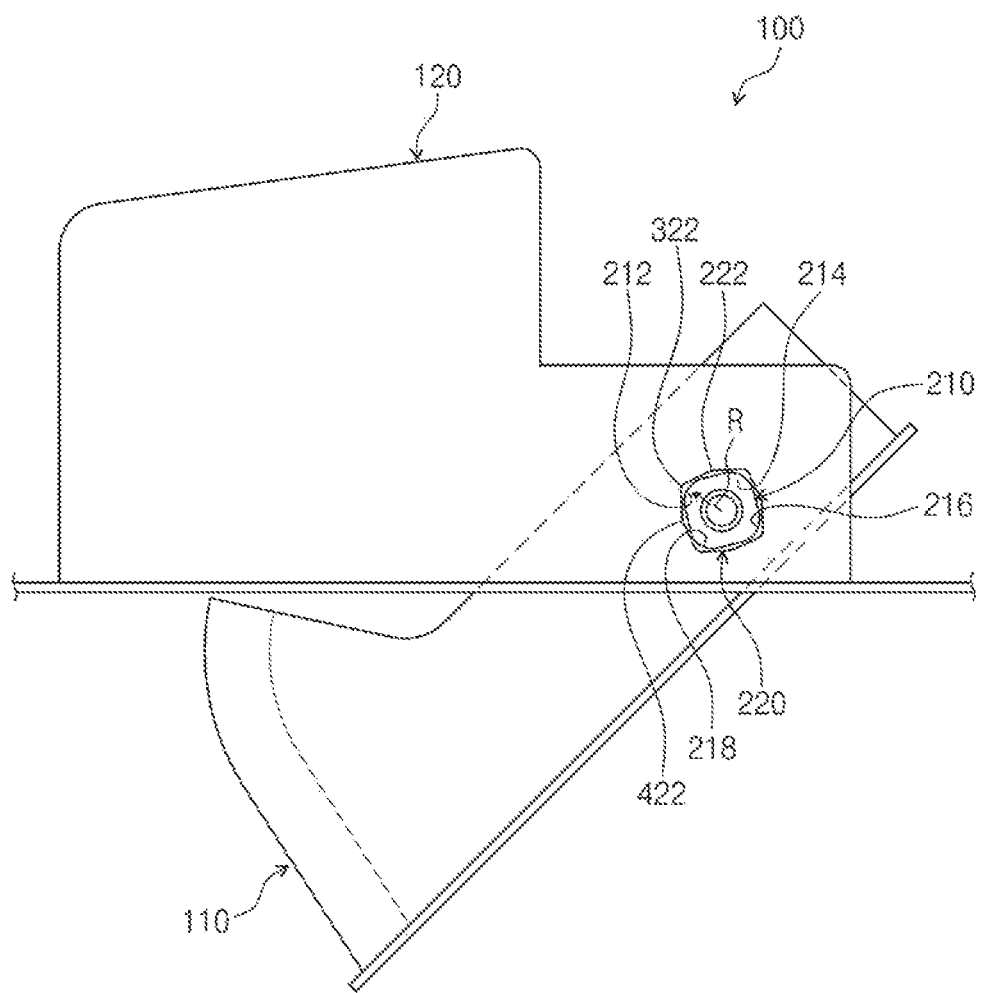
FIG. 3 schematically depicts another cross-sectional view of the vehicle storage assembly referenced in FIG. 2, wherein the storage assembly is positioned in an intermediate position.
Figure 4:
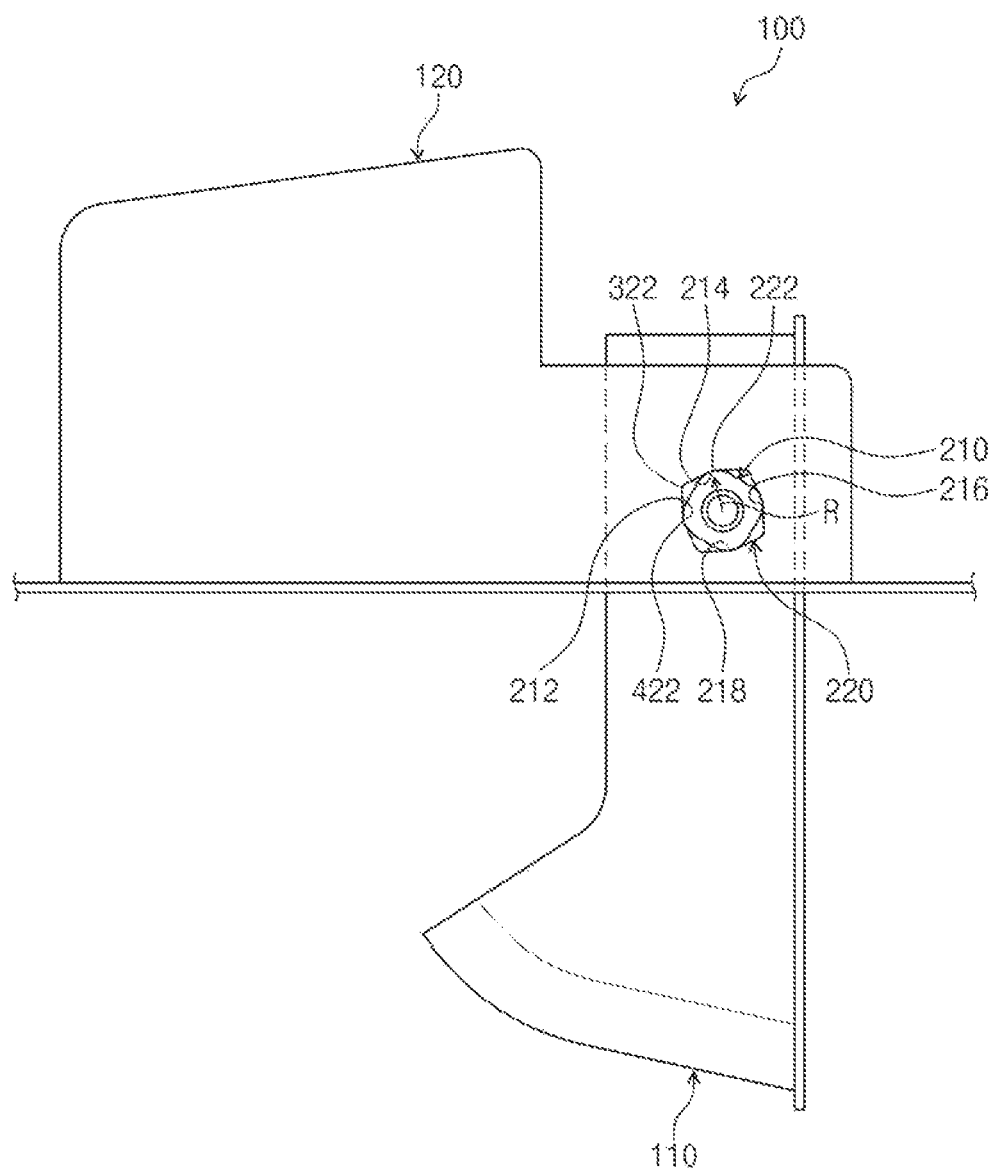
FIG. 4 schematically depicts another cross-sectional view of the vehicle storage assembly referenced in FIG. 2, wherein the storage assembly is positioned in an open position or a second rest position.

FIG. 1 through FIG. 4 illustratively depict a storage assembly 100 for a vehicle according to one embodiment of the present invention. The storage assembly 100 comprises a first portion 110 and a second portion 120. The first portion 110 includes a shaft 210. The shaft 210 has a stop portion 212 protruded in a radial direction R. The second portion 120 includes a shaft hole 220. The shaft hole 220 receives the shaft 210 and allows the shaft 210 to be rotated within the shaft hole 220. The first portion 110 is rotatably connected to the second portion 120 via the shaft 210, so that the first portion 110 could rotate from a first rest position P1 as shown in FIG. 2 to a second rest position P2 as shown in FIG. 4 through an intermediate position P3 as shown in FIG. 3. The shaft hole 220 is configured to contact the stop portion 212 in the first rest position P1 and the second rest position P2, and to space apart from the stop portion 212 at the radial direction R in the intermediate position P3. The rest position may be a temporary secured position or a check position. For example, in the first or second rest position, the first portion 110 may be secured temporarily. The first portion 110 may also move away from the first or second rest position under certain forces.

For illustration purposes, a storage assembly 100 is depicted with referenced to a sunglass bin located at the vehicle overhead console (OHC) herein. However, the storage assembly 100 may be used at other locations of the vehicle such as a rear seat armrest, a door, and a control panel. In addition, the storage assembly 100 may be utilized in a ship, an airplane, and a home or a commercial seat, for example.

FIG. 1 shows a perspective view of a vehicle storage assembly 100 according to one embodiment of the present disclosure. The storage assembly 100 may be located at the OHC. The storage assembly 100 includes a first portion 110, such as a storage bin which may be used to store sunglass in certain instances. The storage assembly 100 includes a second portion 120, such as a frame member to receive the storage bin, which may be secured to the vehicle headliner. In another one or more embodiments, the first portion 110 may be implemented as the frame member and the second portion 120 may be implemented as the storage bin. In FIG. 1, the shaft 210 in the first portion 110 is shown as extending through the shaft hole 220 of the second portion 120 from the side wall of the first portion 110.

FIG. 2 through FIG. 4 illustratively depict the cross-sectional view of part of the first portion 110 of the storage assembly 100 in different positions. As shown in the FIGS. 2-4, the first portion 110 may pivot relative to the second portion 120 between the first rest position P1 and the second rest position P2. The first portion 110 might need to be secured relative to the second portion 120 in the positions P1 and P2. For example, the first rest position P1 may be configured as a closed position in which stored items will not drop from the storage assembly 100; and the second rest position P2 may be configured as an open position in which the stored items could be accessed by users. It is to be appreciated that in other embodiments the first rest position P1 may be configured as the open position and the second rest position P2 may be configured as the closed position. During operation, the first portion 110 may be rotated to an intermediate position P3 between the first rest position P1 and the second rest position P2, and then to the second rest position P2. For the sake of brevity, only one intermediate position P3 is illustratively depicted. In actual implementation, there may be more intermediate positions. It is anticipated that the storage assembly 100 or the first portion 110 may have a third rest position P4 different with the first rest position P1 and the second rest position P2. The first portion 110 may be secured relative to the second portion 120 in the third rest positions P4.

To assist the rotatable connection of the first portion 110 and the second portion 120, the first portion 110 includes a shaft 210 and the second portion 120 includes a shaft hole 220 such that the shaft 210 may at least partially be received with this shaft hole 220 and may rotate within the shaft hole 220. In one embodiment and referring to FIG. 1, the first portion 110 may include a first side wall 112, and the shaft 210 may be arranged on the first side wall 112 and extend therefrom. Similarly, the second portion 120 may include a second side wall 226 opposing to the first side wall 112. The shaft hole 220 may be formed as a through-hole on the second side wall 226. It is to be appreciated that the first portion 110 and the second portion 120 may be of other structures, and the shaft 210 and the shaft hole 220 may be positioned on the first portion 110 and the second portion 120 separately in any other configuration. For example, the shaft may be positioned at the secured second portion, and the shaft hole may be positioned at the rotatable first portion. In this way, the first portion 110 is rotatably connected to the second portion 120 via the shaft 210.

The shaft and the shaft hole are usually formed as having cross-sections of round shape with appropriate sizes, such that the shaft can rotate within the shaft hole. However, inventors of the present invention have recognized that such a structure is at least disadvantageous in that a gap is needed between the shaft and the shaft hole so that the shaft would experience a smaller amount of friction while rotating. Such a gap often prevents the first portion 110 and the second portion 120 from being firmly secured relative to each other in rest positions, such as the first rest position P1 and the second rest position P2, causing NVH issues. The storage assembly 100 according to one or more embodiments of the present invention is at least advantageous in that a shaft and a shaft hole matching with each other are provided such that the first portion 110 and the second portion 120 could contact each other closely in rest positions reducing or eliminating related vibration, while being able to rotate freely with minimized friction in non-rest positions.

According to one or more embodiments of the present invention, the shaft 210 includes one or more stop portions protruding outwardly in the radial direction R of the shaft 210. Referring to FIG. 2, in the depicted embodiment, the shaft 210 may have four stop portions 212, 214, 216, and 218. In one or more embodiments, the shaft 210 may be formed as having a substantially rounded rectangular cross-section. Further, the stop portions may be arranged uniformly along the angular direction or circumferential direction of the shaft 210. For example, the shaft 210 may have a substantially square cross-section. For sake of robustness, the stop portions may be formed with rounded heads or rounded corners to assist matching and rotation within the shaft hole 220. In the embodiment shown in FIG. 2, the shaft 210 may have a substantially rounded square or rectangular cross-section, and the four stop portions 212, 214, 216, and 218 may be formed as having rounded heads.

Correspondingly, the shaft hole 220 may be shaped such that the shaft hole 220 contacts or abuts closely against the stop portion 212 in the first rest position P1 and the second rest position P2, and space apart from the stop portion 212 along the radial direction R in the intermediate position P3. As illustratively depicted in FIG. 2 through 4, the inner wall of the shaft hole 220 may include a first section 222, a second section 422, and an intermediate section 322 positioned between the first section 222 and the second section 422. It is to be appreciated that although the shaft hole 220 is illustratively depicted as having a cross-section similar to the shaft 210, in other embodiments the shaft hole 220 may be of any other cross-section similar to or different from the shaft 210 such that the shaft 210 may rotate within the shaft hole 220, for example 90 degrees, 180 degrees, 360 degrees, etc.

Referring back to FIG. 2, the storage assembly 100 is positioned in its first rest position or closed position P1. The stop portion 212 may contact and abut against the first section 222 of the shaft hole 220. Additionally, another stop portion 218 may contact the shaft hole 220, such as contacts the second section 422 of the shaft hole 220. Such a structure is advantageous in that the movement of the first portion 110 in a direction substantially perpendicular to the shaft 210 or substantially parallel to the first side wall 112 may be restricted. For example, due to the contact between the stop portion 212 and the shaft hole 220, the first portion 110 will not move relative to the second portion 120 in the directions L1 and L2. In other words, the shaft 210 may be in an interference fit relationship with the shaft in the first rest position P1. Thus, the first portion 110 may be relatively secured with the second portion 120.

Referring to FIG. 3, the storage assembly is positioned in the intermediate position P3. The third section 322 of the shaft hole 220 is spaced apart from the stop portion 212 and the shaft 210 in the radial direction R. Similarly, other stop portions 214, 216, and 218 may be spaced apart from the shaft hole 220 radially. In other words, the shaft 210 is in a clearance fit relationship with the shaft hole 220 in the intermediate position P3. For illustration purpose, the shaft 210 is illustratively depicted as positioned in the center of the shaft hole. Due to gravity, the shaft 210 may be positioned in a lower position within the shaft hole 220 and contact the shaft hole 220 in an actual implementation. However, such contact will not affect the rotation of the shaft 210 negatively due to the clearance fit relationship. In this way, the user will not feel large drag forces when rotating the first portion 110 relative to the second portion 120. Further, the third section 322 could prevent the shaft 210 from disengaging with the shaft hole 220 during rotation. Specifically, the shaft hole 220 may be formed as a close loop without a slit, so that the shaft 210 would not separate from the shaft hole 220 even when the vehicle vibrates during driving.

Now referring to FIG. 4, the storage assembly 100 is positioned in the second rest position or open position P2. The stop portion 212 contacts and abuts against the second section 422 of the shaft hole 220. Additionally, another stop portion 214 may contact the shaft hole 220, such as contacts the first section 222 of the shaft hole 220. Similar to the first rest position P1, such a structure is advantageous in that the movement of the first portion 110 in a direction substantially parallel to the first side wall 112 may be restricted. Thus, the first portion 110 may be relatively secured with the second portion 120. In other words, the shaft 210 may be in an interference fit relationship with the shaft in the second rest position P2.

Moreover, as shown in the figures, a maximum distance MD1 is defined between the outside wall of the shaft 210 and the inner wall of the shaft hole 220 in the first rest position P1 or the second rest position P2, and a maximum distance MD2 is defined between the outside wall of the shaft 210 and the inner wall of the shaft hole 220 in the intermediate position P3. MD2 may be less than MD1. The maximum distances MD1 and MD2 will be detailed with reference to FIG. 10.

Figure 5:
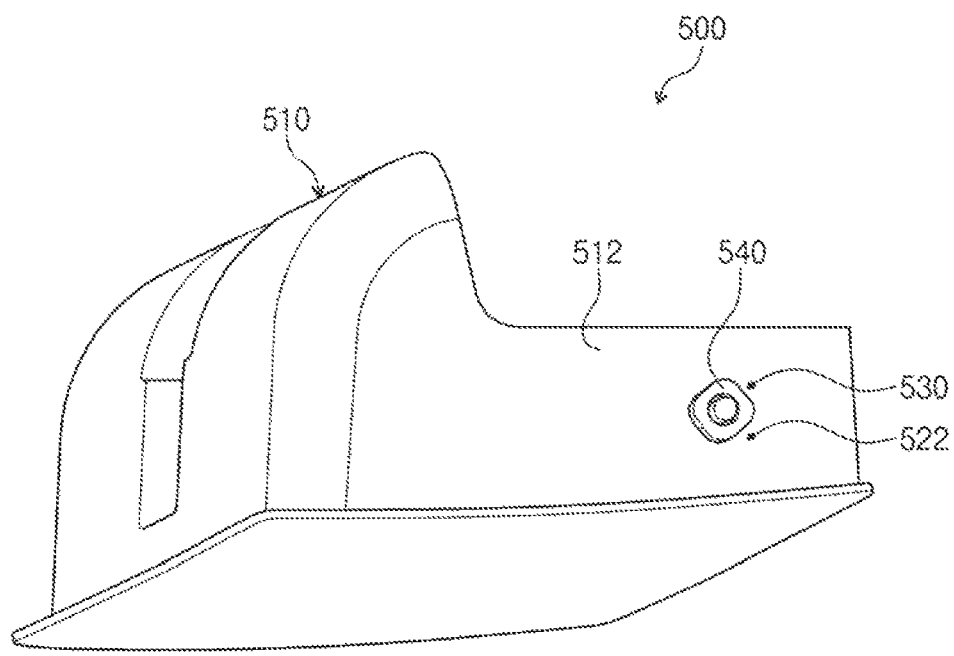
FIG. 5 schematically depicts a perspective view of a first portion of the storage assembly according to another embodiment of the present disclosure.
Figure 6:
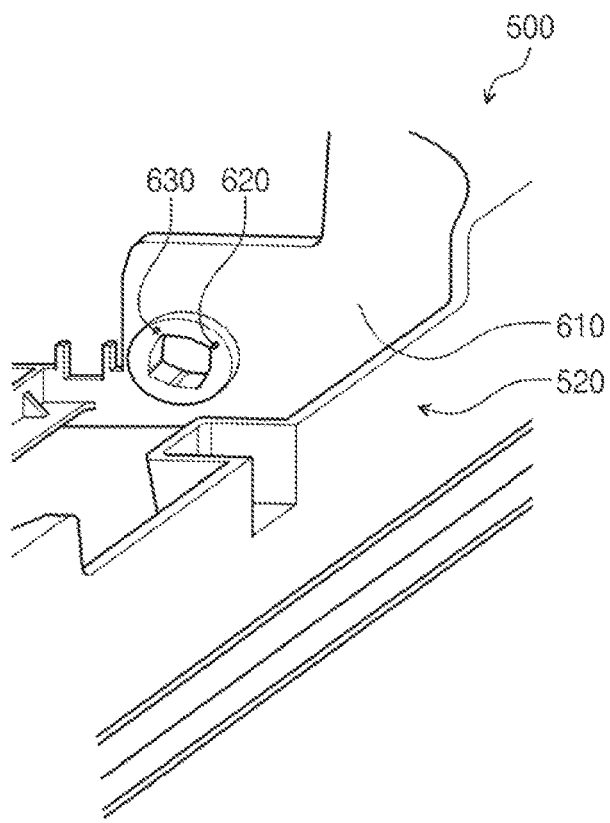
FIG. 6 schematically depicts part of a second portion of the storage assembly referenced in FIG. 5.

FIG. 5 schematically depicts a perspective view of a first portion 510 of a storage assembly 500 according to another embodiment of the present disclosure. FIG. 6 schematically depicts part of a second portion 520 of the storage assembly 500 referenced in FIG. 5. FIG. 7 schematically depicts a cross-sectional view of the storage assembly 500, wherein the storage assembly 500 is positioned in the first rest position. FIG. 8 schematically depicts another cross-sectional view of the storage assembly 500, wherein the storage assembly 500 is positioned in the intermediate position.

Referring to FIG. 5, in one or more embodiments, the first side wall 512 of the first portion 510 may optionally include a first projection 522. In the depicted embodiment, the first projection 522 is positioned adjacent to the shaft 540. Referring to FIG. 6, the second side wall 610 may include a second projection 620. For illustration purposes, the first and second projections 522, 620 are shown as cylinders. In other embodiments, the first and second projection 522, 620 may be of other regular or irregular shapes such as prisms, cones, etc. As needed, the first and second projections 522, 620 may extrude from the first and second side wall 512, 610 separately at any distance, such as 0.5 mm, 1.0 mm, 1.5 mm, etc. Moreover, the first and the second projection 522, 620 may have a ramped or rounded head to facilitate their engaging and disengaging.

Referring to FIG. 7, in the first rest position, the first projection 522 may contact the second projection 620 along the axial direction L of the shaft 540. For illustration purposes, a gap 650 is shown between the first projection 522 and the second projection 620. In an actual implementation, the first and second projections 522, 620 may contact with each other. Such a structure is especially advantageous in that the movement of the first portion 510 is in a direction substantially perpendicular to the first side wall 512 in the first rest position P1 so that the first portion 510 may be further secured against the second portion 520.

Additionally and referring back to FIG. 5, the first side wall 512 may include a third projection 530 which may be configured as contacting the second projection 620 axially in the second rest position P2. Such a structure is especially advantageous in that the movement of the first portion 510 in a direction substantially perpendicular to the first side wall 512 is restricted in the second rest position P2 so that the first portion 510 may be further secured against the second portion 520.

Additionally or alternatively, referring to FIG. 6, the second side wall 610 may include a fourth projection 630 which may be configured as contacting the first projection 522 axially in the second rest position P2. Such structure is especially advantageous in that the movement of the first portion 510 in a direction substantially perpendicular to the first side wall 512 is restricted in the second rest position P2 so that the first portion 510 may be further secured against the second portion 520.

Referring to FIG. 8, the first projection 522 and the second projection 620 are offset with each other in the intermediate position P3, such that a gap A is axially defined between the second projection 620 and the first side wall 512. Due to the gap A, the rotation of the first portion 510 relative to the second portion 520 from the first rest position P1 to the second rest position P2 will be subjected to less drag force.

Figure 9:
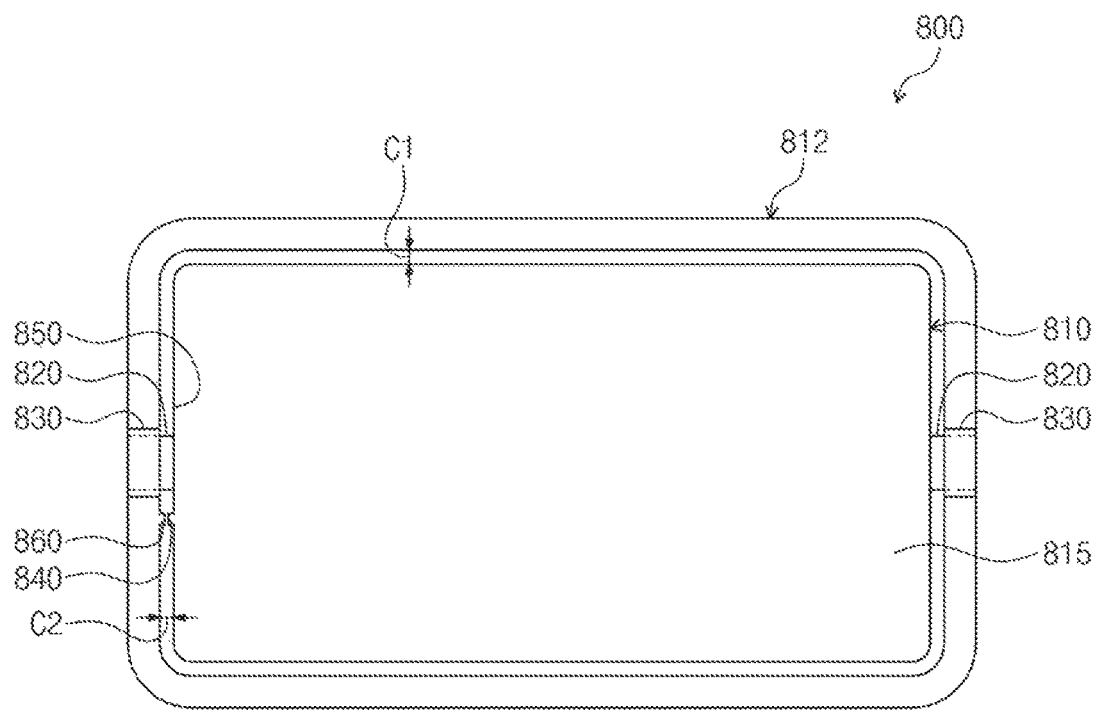
FIG. 9 schematically depicts a plane view of the storage assembly according to another embodiment of the present disclosure.

FIG. 9 illustratively depicts a plane view of a storage assembly 800 according to another embodiment of the present invention. The storage assembly 800 includes a first portion such as a storage bin 810 and a second portion such as a frame member 820. The storage bin 810 may include a cover 815. The storage bin 810 is shown as in its closed position in FIG. 9. The cover 815 and the peripheral inner wall of the frame member 820 are arranged such that a first gap C1 in a direction substantially parallel to the first side wall 850 of the cover 815 and a second gap C2 in a direction substantially perpendicular to the first side wall 850 exist. The first side wall 850 may be a side wall opposing to the shaft 820. In closed position (e.g., the first rest position P1), as described herein elsewhere, the stop portion of the shaft 820 contacts the inner wall 830 of the shaft hole to restrict the movement of the storage bin 810 or the cover 815 in the direction substantially parallel to the first side wall 850, thus limiting the first gap C1 between the cover 815 and the inner wall of the frame member 820. Similarly, as described herein elsewhere, the first projection 840 of the storage bin 810 may contact the second projection 860 of the frame member 820 to restrict the movement of the storage bin 810 or the cover 815 in the direction substantially perpendicular to the first side wall 850, thus limiting the second gap C2. In this way, the stop portion, the first projection, and the second projection may be provided synergistically so that uniform and relatively smaller gaps may be defined between the cover 815 and the frame member 820, providing a better appearance for the storage assembly.

Figure 10:
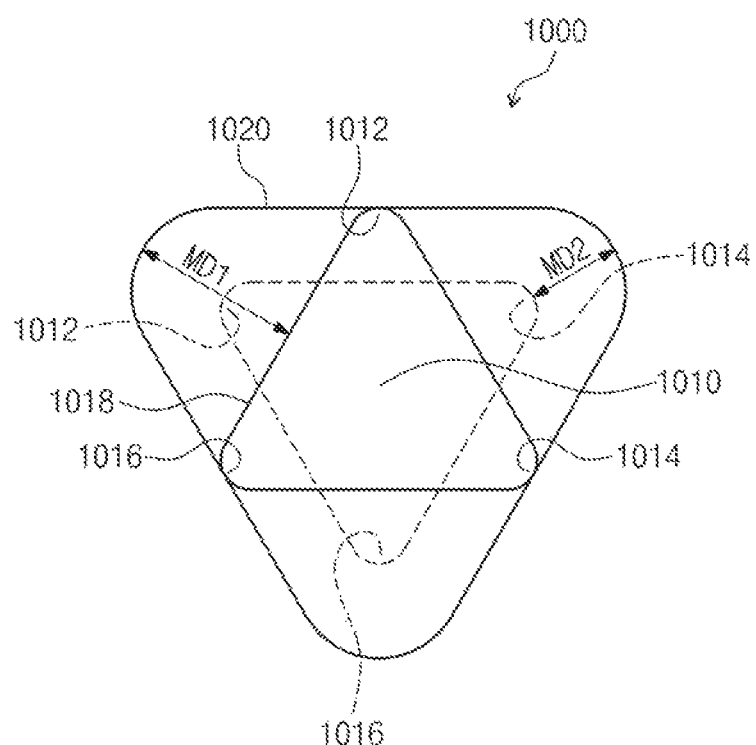
FIG. 10 schematically depicts a cross-sectional view of part of the storage assembly according to another embodiment of the present disclosure.

FIG. 10 illustratively depicts part of a storage assembly 1000 according to another embodiment of the present invention. The shaft 1010 is shown in the first rest position as solid lines and in the intermediate position as dashed lines. The inner wall of the shaft hole 1020 is also depicted. The shaft 1010 may include three stop portions 1012, 1014, and 1016. As needed, stop portions may be positioned uniformly relative to each other in the circumferential or angular directions of the shaft 1010. In the embodiment shown in FIG. 10, the shaft 1010 may be formed as a regular triangle. For sake of robustness, the stop portion may include a rounded head to facilitate cooperation with the shaft hole 1020. In the embodiment shown in FIG. 10, the shaft 1010 has a cross-section that is a triangle with rounded corners. As depicted in FIG. 10, the maximum distance MD1 between the edge 1018 of the shaft 1010 and inner wall of the shaft hole 1020 in rest positions is larger than the maximum distance MD2 between the edge 1018 of the shaft 1010 and inner wall of the shaft hole 1020 in the intermediate or non-rest positions.

In one or more embodiments, the present disclosure provides a storage assembly for a vehicle. One skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A storage assembly, comprising:
    a first portion including a shaft, the shaft having a stop portion protruded radially; and
    a second portion including a shaft hole receiving the shaft to rotate therein; wherein
    the first portion is rotatably connected to the second portion via the shaft to rotate from a first rest position to a second rest position through an intermediate position, the shaft hole is configured to contact the stop portion in the first rest position and the second rest position and to space apart radially from the stop portion in the intermediate position.

2. The storage assembly of claim 1, wherein the shaft hole has a first section, a second section, and an intermediate section connecting the first section and the second section, wherein the first section and the second section contact the stop portion, and the intermediate section is spaced apart from the shaft radially in the first rest position and the second rest position.

3. The storage assembly of claim 2, wherein the shaft includes four stop portions.

4. The storage assembly of claim 3, wherein the shaft has a substantially rounded rectangular cross-section.

5. The storage assembly of claim 1, wherein the shaft includes at least three stop portions.

6. The storage assembly of claim 5, wherein the stop portions are positioned uniformly along a circumference.

7. The storage assembly of claim 1, wherein the first portion includes a first side wall having a first projection, the second portion includes a second side wall having a second projection, the shaft is positioned on the first side wall, the shaft hole is positioned on the second side wall, the first projection contacts the second projection in a radial direction of the shaft in the first rest direction.

8. The storage assembly of claim 7, wherein the first side wall of the first portion further includes a third projection positioned to contact the second projection of the second portion in the second rest position.

9. The storage assembly of claim 7, wherein the second side wall of the second portion further includes a fourth projection positioned to contact the first projection of the first portion in the second rest position.

10. The storage assembly of claim 1, wherein the second portion is formed as a frame member secured to a headliner in a vehicle, and the first portion is formed as a sunglass bin received within the frame.

11. The storage assembly of claim 1, wherein the shaft hole is configured to be in an interference fit relationship with the shaft in the first rest position and the second rest position.

12. A storage assembly, comprising:
    a storage bin including a first side wall and a shaft positioned on the first side wall wherein the shaft has a cross-section that is a polygon shape having rounded corners,
    a frame member to receive the storage bin, wherein the frame member includes a second side wall and a shaft hole positioned on the second side wall;
    wherein the shaft is positioned within the shaft hole, the storage bin is rotatably connected to the frame member via the shaft and is rotatable from a first rest position to a second rest position relative to the frame member,
    wherein the rounded corners of the shaft contact a corresponding inner wall of the shaft hole in the first rest position and the second rest position, and a maximum distance between each side of the shaft and the corresponding inner wall of the shaft hole in the first and second rest positions is greater than a maximum distance between the side of shaft and the corresponding inner wall at an intermediate position.

13. The storage assembly of claim 12, wherein the first rest position is an open position of the storage bin and the second rest position is a closed position of the storage bin.

14. The storage assembly of claim 13, wherein the storage bin is capable of being rotated to an intermediate position between the open position and the closed position of the storage bin.

15. The storage assembly of claim 12, wherein the storage bin includes a cover, and a peripheral gap is formed between the cover and the inner wall of the frame member, wherein the contact between the rounded corners of the shaft and the corresponding inner wall of the shaft hole restricts the movement of the cover in a first direction substantially parallel to the first side wall to limit a size of a first gap in the first direction between the cover and the peripheral gap of the frame member.

16. The storage assembly of claim 12, wherein the shaft has a rounded rectangular cross-section, and the shaft hole is configured to allow the shaft to rotate 360 degrees.

17. The storage assembly of claim 12, wherein the shaft has a rounded triangular cross-section, and the shaft hole is configured to allow the shaft to rotate 360 degrees.

18. The storage assembly of claim 12, wherein the first side wall includes a first projection and a third projection, the second side wall includes a second projection and a fourth projection, wherein the first projection contacts the second projection in a radial direction of the shaft in the first rest position and contacts the fourth projection in the radial direction in the second rest position, wherein the second projection contacts the third projection in the radial direction in the second rest position; and wherein the radial contact between the first and second projections, the radial contact between the second and third projections, and the radial contact between the first and fourth projections restrict the movement of the storage bin in a second direction substantially perpendicular to the first side wall to limit a size of a second gap in the second direction between the cover and the peripheral inner wall of the frame member.

19. The storage assembly of claim 12, wherein the side wall of the storage bin includes a first projection and a third projection, the side wall portion of the frame member includes a second projection and a fourth projection, wherein the first projection contacts the second projection in the radial direction in the open position, and the third projection contacts the second projection and the fourth projection contact the first projection in the radial direction in the closed position.

20. A storage assembly positioned on a headliner of a vehicle, comprising;
　　a storage bin including a cover and two opposing side walls, each side wall having a shaft with a cross-section that is a polygon having rounded corners; and
　　a frame member secured to the headliner, including an opening, side wall portions corresponding to the side walls of the storage bin, and shaft holes positioned on the side wall portions; wherein
　　the storage bin is positioned at the opening and rotatably connected to the frame member via the shaft, the storage bin is rotatable from an open position to a closed position relative to the frame member; the rounded corners of the shaft contact a corresponding inner wall of the shaft hole to restrict the movement of the storage bin in a radial direction in the open position and the closed position.

\* \* \* \* \*